(12) United States Patent
Borggaard et al.

(10) Patent No.: US 9,479,922 B2
(45) Date of Patent: Oct. 25, 2016

(54) PROVISIONING A PLURALITY OF COMPUTING DEVICES

(71) Applicant: Google Inc., Mountain View, CA (US)

(72) Inventors: Geoffrey Allen Borggaard, Lincoln, MA (US); William Bennett Brockman, Newton, MA (US)

(73) Assignee: GOOGLE INC., Mountain View, CA (US)

( * ) Notice: Subject to any disclaimer, the term of this patent is extended or adjusted under 35 U.S.C. 154(b) by 206 days.

(21) Appl. No.: 13/862,256

(22) Filed: Apr. 12, 2013

(65) Prior Publication Data

US 2014/0310350 A1    Oct. 16, 2014

(51) Int. Cl.
*H04W 8/20*    (2009.01)
*H04W 4/00*    (2009.01)

(52) U.S. Cl.
CPC ............... *H04W 8/20* (2013.01); *H04W 4/008* (2013.01)

(58) Field of Classification Search
CPC . H04L 67/125; H04L 41/0806; H04L 63/10; H04L 67/1068; H04L 67/16
USPC ......................................................... 709/204
See application file for complete search history.

(56) References Cited

U.S. PATENT DOCUMENTS

| | | | |
|---|---|---|---|
| 7,577,722 B1 | 8/2009 | Khandekar et al. | |
| 8,014,720 B2* | 9/2011 | Lortz ............................ | 455/41.1 |
| 8,037,289 B1 | 10/2011 | Karnik et al. | |
| 8,224,246 B2 | 7/2012 | Suumaki | |
| 8,843,398 B2 | 9/2014 | Argue et al. | |
| 2007/0081508 A1 | 4/2007 | Madhavan et al. | |
| 2008/0014984 A1* | 1/2008 | Brown et al. ............... | 455/552.1 |
| 2008/0065993 A1 | 3/2008 | Huang | |
| 2008/0070495 A1* | 3/2008 | Stricklen et al. ............ | 455/3.01 |

(Continued)

FOREIGN PATENT DOCUMENTS

| | | |
|---|---|---|
| EP | 2077652 A2 | 7/2009 |
| EP | 2306692 A1 | 4/2011 |

(Continued)

OTHER PUBLICATIONS

Lee, "Amplify Tablet: The Ideal School Tablet Designed with Teachers & Students in Mind," retrieved from http://davidleetech.blogspot.com/2013/amplify-tablet-ideal-school-tablet.html, Mar. 6, 2013, 5 pp.

(Continued)

*Primary Examiner* — Ruolei Zong
(74) *Attorney, Agent, or Firm* — Shumaker & Sieffert, P.A.

(57) ABSTRACT

Example techniques and systems may transmit provisioning information to respective computing devices for self-provisioning of each of the respective computing devices. In one example, a technique may include receiving, by a first computing device, account information for a plurality of users and sensing, with the first computing device, a second computing device in wireless communication range of the first computing device. Responsive to sensing the second computing device, the method may also include transmitting, by the first computing device and via wireless device-to-device communication, provisioning information from the first computing device to the second computing device. The provisioning information may include instructions for the second computing device to self-provision with a user account associated with one or more of the plurality of users.

19 Claims, 6 Drawing Sheets

(56) References Cited

U.S. PATENT DOCUMENTS

| | | |
|---|---|---|
| 2009/0064132 A1 | 3/2009 | Suchy et al. |
| 2009/0170432 A1* | 7/2009 | Lortz ............................ 455/41.1 |
| 2009/0325491 A1* | 12/2009 | Bell ........................ H04L 12/66 |
| | | 455/41.3 |
| 2010/0304670 A1* | 12/2010 | Shuo ............................ 455/41.1 |
| 2012/0086559 A1 | 4/2012 | Trappeniers et al. |
| 2012/0303496 A1 | 11/2012 | Musfeldt |
| 2012/0324119 A1 | 12/2012 | Imes et al. |
| 2013/0017784 A1 | 1/2013 | Fisher |
| 2013/0032634 A1* | 2/2013 | McKirdy ...................... 235/375 |
| 2013/0060395 A1 | 3/2013 | Burke et al. |
| 2013/0087608 A1 | 4/2013 | Addy et al. |
| 2013/0095756 A1 | 4/2013 | Hamilton et al. |
| 2013/0171929 A1* | 7/2013 | Adams et al. ................ 455/41.1 |
| 2013/0212219 A1* | 8/2013 | Koskela et al. .............. 709/217 |
| 2014/0274014 A1* | 9/2014 | Dodla .................. H04B 5/0031 |
| | | 455/418 |

FOREIGN PATENT DOCUMENTS

| | | |
|---|---|---|
| WO | 2005053228 A1 | 6/2005 |
| WO | 2010103414 A1 | 9/2010 |

OTHER PUBLICATIONS

"Tablet Computers in Education," Educational Resources, retrieved from http://edresources.com/TablesinEducation.aspx, accessed on Mar. 27, 2013, 12 pp.

Dunn, "The Amplify Tablet: A Device Custom Made For Teachers and Students," retrieved from http://edudemic.com/2013/03/the-amplify-tablet-a-device-custom-made-for-teachers-and-students/, (Link includes embedded video), Mar. 6, 2013, 4 pp.

Specification of the Bluetooth System, Part E, Service Discovery Protocol, Dec. 1999, 63 pp.

International Search Report and Written Opinion from International Application No. PCT/US2014/033823, dated Mar. 6, 2015, 12 pp.

International Preliminary Report on Patentability from counterpart International Application No. PCT/US2014/033823, mailed Oct. 22, 2015, 8 pp.

* cited by examiner

PROVISIONING A PLURALITY OF COMPUTING DEVICES

BACKGROUND

Computing devices may be configured to execute a variety of different applications (e.g., software programs). Before a computing device can execute any application, the computing device may need to install different applications. This process may be described as provisioning the computing device. The provisioning process may involve installing applications or otherwise preparing the computing device to a state in which it can be handed-off to an end user for one or more specific uses or functions. For example, an administrator may interact with the user interface of the computing device such that the computing device receives instructions to download and/or install the applications intended for the end user. Each computing device to be provisioned may receive similar user input from the administrator and install the selected applications as indicated by the user input.

SUMMARY

In one example, a method includes receiving, by a first computing device, account information for a plurality of users, sensing, by the first computing device, a second computing device in wireless communication range of the first computing device, and responsive to sensing the second computing device, transmitting, by the first computing device and via wireless device-to-device communication, provisioning information to the second computing device, wherein the provisioning information includes instructions for the second computing device to automatically configure itself, via a network, with one or more applications of a user account associated with one or more of the plurality of users.

In another example, a computing device includes one or more processors configured to receive account information for a plurality of users, sense a user computing device in wireless communication range of the computing device, and responsive to sensing the user computing device, transmit, via wireless device-to-device communication, provisioning information to the user computing device, wherein the provisioning information includes instructions for the user computing device to automatically configure itself, via a network, with one or more applications of a user account associated with one or more of the plurality of users.

In an additional example, a computer-readable storage medium comprising instructions that, when executed, configure one or more processors of a computing device to receive account information for a plurality of users, sense a user computing device in wireless communication range of the computing device, and responsive to sensing the user computing device, transmit, via wireless device-to-device communication, provisioning information to the user computing device, wherein the provisioning information includes instructions for the user computing device to automatically configure itself, via a network, with one or more applications of a user account associated with one or more of the plurality of users.

In an additional example, a method includes sensing, by a first computing device, a second computing device in wireless communication range of the first computing device and, responsive to sensing the second computing device, transmitting, by the first computing device and via wireless device-to-device communication, provisioning information to the second computing device. The provisioning information may include network credentials that allow the second computing device to access a network, one or more setting values that limit a respective function of the second computing device, an administrator password, and instructions for the second computing device to automatically configure itself, via the network, with at least one application for use by a user.

The details of one or more examples are set forth in the accompanying drawings and the description below. Other features, objects, and advantages of the disclosure will be apparent from the description and drawings, and from the claims.

DETAILED DESCRIPTION

Figure 1:
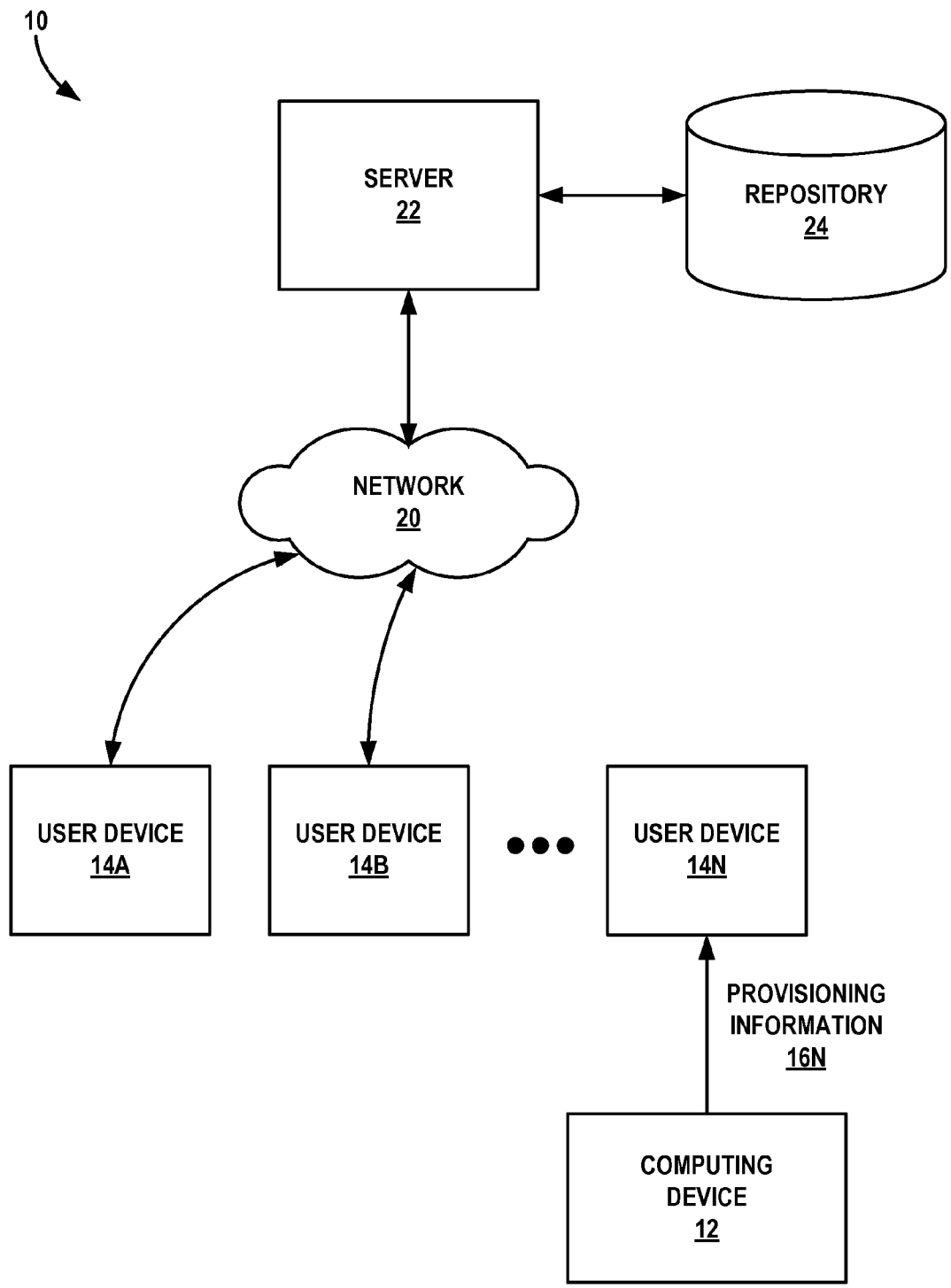
FIG. 1 is a conceptual diagram illustrating an example computing device that is configured to transmit, via wireless device-to-device communication, provisioning information to respective user devices, in accordance with one or more aspects of the present disclosure.

The disclosure describes examples of transmitting provisioning information to respective computing devices for self-provisioning of each of the respective computing devices. Before a computing device is ready for use by an end-user (e.g., a user of the computing device), the computing device may need to be provisioned, or set-up, with various software applications, values for various settings or configuration parameters, and any other user-specific information that is required for or facilitates use of the computing device. Typically, a person may need to manually interact with a user interface of the computing device to provide input to the computing device such that the computing device installs applications, sets values for various settings, or performs any other functions in response to the user input during the provisioning process.

This manual process of provisioning the computing device may be problematic for large entities (e.g., schools, businesses, or other organizations) for which dozens, hundreds, or even thousands of computing devices need to be provisioned for use by respective users (e.g., students or employees). Although each of the users can receive their respective non-provisioned computing device and perform the manual provisioning process themselves, this option may result in the computing device being improperly provisioned, extensive set-up time required by each user, and the user may have control over the computing device instead of the entity. Moreover, the user-based provisioning process may be impractical for technologically-novice users and small children. In some cases, an information technology (IT) professional of the entity may provision each of the computing devices, but this manual provisioning process may be inefficient and too time consuming for a practical solution.

As described herein, the provisioning process for user computing devices (e.g., mobile computing devices such as smartphones or tablet computers, notebook computers, or desktop computers) may be at least partially automated such that an administrator computing device transmits provisioning information (e.g., unique provisioning information or generic provisioning information) to the respective user computing device via device-to-device communication. For example, an administrator may physically place the user computing device within the wireless communication range of the administrator computing device (e.g., back-to-back for near-field communication). In response to receiving the provisioning information, each of the user computing devices may automatically connect to a network, retrieve information (e.g., software applications, values for various settings, etc.) associated with a user account indicated by the provisioning information, and otherwise set-up the user computing device for use by one or more users associated with the user account. In this manner, each of the user computing devices may be provisioned for respective user accounts by passing each user computing device in proximity with the administrator device, without a user needing to physically touch or manually interact with the user interface of each user computing device. In other examples, the provisioning information may be generic to each user device such that a user account is added to each user device by the user or other later time.

In some examples, the administrator computing device may generate the unique provisioning information for the user accounts of each of the plurality of users. The unique provisioning information may indicate or include a user account associated with each of the users. The user account may be a unique portion of the provisioning information for each user computing device. In addition, the unique provisioning information for many users may include some common information. For example, the provisioning information may identify or include network credentials that allow the user computing device to recognize and/or access a network to complete the provisioning process.

In one example, the administrator computing device may transmit the unique provisioning information via near-field communication (NFC). In response to sensing a user computing device, the administrator computing device may transmit the unique provisioning information via NFC to a user computing device. The unique provisioning information may be a packet of data that is transmitted quickly, such as less than a minute or only a few seconds). In response to receiving the unique provisioning information, the user computing device may use the unique provisioning information to connect to a wireless network and retrieve applications, setting values, or any other information related to one or more accounts identified by the unique provisioning information. After transmitting the unique provisioning information, the administrator computing device may select the next unique provisioning information and sense for another user computing device to which the administrator computing device will transmit the next unique provisioning information.

In another example, the administrator computing device may transmit the unique provisioning information via visual representations of the data (e.g., one-dimensional bar codes, two-dimensional bar codes such as QR codes, etc.). In response to sensing a user computing device, the administrator computing device transmit the unique provisioning information by presenting one or more visual representations of the unique provisioning information at a display device of the administrator computing device. The user computing device may use an optical sensor (e.g., a camera) to obtain an image of the visual representation and the unique provisioning information. In some examples, the user computing device may, in response to obtaining the image of the visual representation and the unique provisioning information, present a visual representation of a confirmation that the unique provisioning information was received.

One or more aspects of the disclosure may be operable only when a user has explicitly enabled such functionality. For example, an administrator computing device may only obtain account information and/or transmit provisioning information in the instance where an administrator and/or the respective users have explicitly consented to the use of such data. In addition, account information may only be transmitted between computing device only when the users/owner of such account has consented to such transmission or use of the data. In this manner, each user may control any and all of data collection and data transmission as described herein. The user may consent or revoke consent to the collection and/or transmission of any data at any time. Furthermore, various aspects of the disclosure may be disabled by the user.

FIG. 1 is a conceptual diagram illustrating an example computing device 12 that is configured to transmit, via wireless device-to-device communication, unique provisioning information to respective user devices 14. As shown in FIG. 1, system 10 includes computing device 12, user devices 14A, 14B, and 14N (collectively "user devices 14"), network 20, networked server 22, and repository 24. Computing device 12, in some examples, is or is a part of a portable computing device (e.g., a mobile phone, a smartphone, a netbook computer, a notebook computer, a tablet computing device, or a smart watch). In other examples, computing device 12 may be at least a part of a workstation or other non-portable computing device. Computing device 12 may be described as an administrator computing device, as computing device 12 may used by an administrator or other person in control of provisioning user devices 14. Each of user devices 14 may be user computing devices intended for use by end-users such as students or employees associated with an entity.

Computing device 12 may be configured to connect to network 20 (e.g., a wired or wireless network). In some examples, computing device 12 may also be configured to communicate with networked server 22 via network 20 to manage one or more accounts and/or access information stored in repository 24. Subsequent to receiving respective provisioning information 16, as described in more detail below, user devices 14 may also be configured to connect to network 20 and communicate with server 22. Although network 20 may be a single network, network 20 may be representative of two or more networks configured to provide network access to server 22 and/or repository 24.

Computing device 12 may include various components that provide respective functionality. For example, computing device 12 may include a display device and one or more cameras, microphones, and speakers. The display device may include one or more input devices and/or output devices that facilitate administrator communication with computing device 12. In one example, the display device may include a touch screen interface (e.g., a presence-sensitive display that includes a presence-sensitive input device). In other examples, the display device may include a display and one or more buttons, pads, joysticks, mice, tactile device, or any other device capable of turning user actions into electrical signals that control computing device 12. In any example, the administrator may interact with the display device or any other input devices to provide input prior to or during the processes described herein. Each of user devices 14 may include similar features, such as one or more display devices, cameras, microphones, and speakers.

In the example of FIG. 1, computing device 12 and user devices 14 are described as a tablet computing device (e.g., a mobile computing device). However, in other examples, computing device 12 and user devices 14 may be a personal digital assistant (PDA), a desktop computer, a laptop computer, a tablet computer, a portable gaming device, a portable media player, a camera, an e-book reader, a watch, or another type of computing device. Although computing device 12 and user devices 14 may all be the same type of device (e.g., tablet computing devices), different types of devices may still provide device-to-device communication used during the provisioning process. For example, computing device 12 may be a notebook computer and user devices 14 may be tablet computing devices. In addition, user devices 14 may, or may not, all be of the same type of computing device.

As described herein, each of user devices 14 may communicate with one or more servers 22 to retrieve information related to accounts associated with the provisioning information transmitted by computing device 12. Each of user devices 14 may initially be new or previously unused devices, or one or more of user devices 14 may have been restored to factory settings or otherwise not be associated with any user-specific information. Prior to receiving provisioning information from computing device 12, each user device 14 may include some software or applications, such as an operating system and/or other software that allows for minimum level of functionality of the respective user device. However, until user devices 14 are provisioned, each user device may not have any specific or unique information or data related to any specific user. In this manner, user devices 14 may be generic devices with generic software pre-installed. Computing device 12 may begin the provisioning process which includes changing various setting values, adding additional software, and/or removing selected software to personalize the respective user device to a selected user account associated with one or more of a plurality of users.

In one example, computing device 12 (e.g., an administrator device configured to begin the provisioning process) may be configured to receive account information for a plurality of users. Computing device 12 may also be configured to sense one of user devices 14 in wireless communication range of computing device 12. Responsive to sensing one of user devices 14, computing device 12 may be configured to transmit, via wireless device-to-device communication, provisioning information 16 to the user device (e.g., provisioning information 16N to user device 14N). Provisioning information 16N may include instructions for the user device 14 to automatically configure itself, via network 20, with one or more applications of a user account associated with one or more of the plurality of users.

As shown in FIG. 1, computing device 12 may transmit provisioning information 16N to user device 14N in response to sensing user device 14N within communication range. In response to receiving provisioning information 16N, user device 14N may configure itself by using at least a portion of provisioning information 16N to access network 20 and retrieve additional information related to one or more accounts indicated by provisioning information 16N. As shown in FIG. 1, computing device 12 has already transmitted provisioning information (e.g., provisioning information similar to provisioning information 16N) to each of user devices 14A and 14B. User devices 14A and 14B can thus automatically retrieve additional information from server 22 via network 20 and configure themselves with information related to respective user accounts. In this manner, computing device 12 may transmit different provisioning information to respective user devices (e.g., dozens or hundreds of user devices similar to user devices 14) and let each of the user devices complete the configuration, or provisioning process, without any further input from computing device 12 or user interaction. Computing device 12 may transmit the respective unique provisioning information to each user device 14 as the user devices are iteratively placed within physical proximity (e.g., within communication range) of computing device 12.

Computing device 12 may receive account information for, or associated with, a plurality of users. The plurality of users may be end-users that will interact with respective user devices 14. For example, the plurality of users may be students enrolled in one or more classes, employees of a company, or any other group of users. Typically, the plurality of users may be associated with a single entity or institution. However, the plurality of users may be associated with different entities in other examples. The account information may include information associated with one or more types of accounts. For example, the account information may include information identifying and/or describing user accounts for each of the plurality of users. In some examples, each of the user accounts may be associated with groups of the users. Since each user account may differ by at least the user to which it is associated, the information related to the user accounts may make provisioning information for one of user devices 14 different than, or unique from, provisioning information for another one of user devices 14. In some examples, the user accounts may be stored in the form of a list of all users within a particular group of users that will receive user devices 14.

The account information may also include information identifying and/or describing an owner account associated with an entity or institution that owns or otherwise manages user devices 14. The owner account may be common to all of user devices 14. In this manner, each of user devices 14 may be managed by the administrator that has access to the owner account. Management of each user device 14 may be performed remotely by an administrator via network 20 such that various tasks may be performed without the need for user interaction. By including both owner account information and user account information, each of user devices 14 may be provisioned with the owner account and a unique user account.

In some examples, the owner account may only be used during self-provisioning of user devices 14 (e.g., to set various setting values, validate user accounts, or provide temporary administrator access). After user device 14 is configured, or provisioned, user device 14 may delete the owner account from user device 14. In another example, the owner account may be a single-use account that is used during the provisioning process. This single-use account may be used by user device 14 to configure itself via network 20 and server 22. However, after user device 14 is configured with one or more user accounts, the single-use account may be inactive and/or deleted by user device 14.

In this manner, each unique provisioning information (e.g., provisioning information 16N), may include information indicative of one or more types data. The unique provisioning information may include information indicative of an owner account associated with an entity to be in control of user devices 14 and a respective user account associated with one of the plurality of users. The unique provisioning information may also include information related to a network and/or server that allows the respective user device 14 to connect to network 20 and retrieve applications, setting values, and any other information related to the owner account, the user account, or otherwise provision user device 14 for the user. In some examples, the information related to the network may include network credentials for accessing network 20. The network credentials may include the name of the network (e.g., a wireless network) and a password that enables the user device to access network 20. The password may be generic to all user accounts or user account specific (e.g., each set of unique provisioning information may include a different password to network 20). After receiving unique provisioning information that includes this data, the receiving user device may initiate the self-provisioning process (e.g., retrieving applications or any other data from server 22 to configure the user device for use by the user of the user account).

In some examples, the provisioning information may include or indicate a device policy that provides one or more limitations to respective functions of the user device. In other words, the device policy may be indicated by one or more setting values to respective features or functions that limit, block, or otherwise regulate each of user devices 14 to the requirements of the device policy. For example, the device policy may block certain component functions (e.g., cameras), functionalities, and/or access to various networks and/or websites, or restrict any other features or content. As another example, the setting values of the device policy may prevent a user from installing games or any other unauthorized applications. In other words, the device policy may set one or more rules for use or otherwise lockdown one or more functions of each one of user devices 14 before a user has access to the respective user device.

The device policy may be generic to all user accounts or customized to one or more user accounts. Each user device 14 may retrieve setting values for the device policy from server 22 during the self-provisioning process after receiving the unique provisioning information. Alternatively, the provisioning information transmitted by computing device 12 may include the one or more setting values for respective functions of the device policy. In other examples, the device policy may be included in or associated with the owner account and/or specific user account.

Before computing device 12 (e.g., an administrator computing device) transmits provisioning information 16N to user device 14N, computing device 12 may be configured to sense that user device 14N is within wireless communication range of computing device 12. For example, if the wireless device-to-device communication is near-field communication (NFC), user device 14N may be within communication range when computing device 12 receives an NFC signal or otherwise detects the magnetic field produced by an NFC unit of user device 14N. In another example, if the wireless device-to-device communication includes optical sensing, user device 14N may be within communication range when computing device 12 obtains an image, via an optical sensor, representative of user device 14N. In alternative examples, computing device 12 may any other communication or detection modality to sense user device 14N. Computing device 12 may use the same modality or different modalities to sense user device 14N and transmit provisioning information 16N. In other examples, computing device 12 may not need to sense the presence of user device 14N prior to transmitting provisioning information 16N.

Provisioning information 16N may be unique provisioning information that is different from the provisioning information transmitted to any other user devices 14. Provisioning information 16N may thus include unique provisioning information specific for each of the plurality of users associated with respective user accounts. In this manner, computing device 12 may only transmit provisioning information 16N to user device 14N. Computing device 12 may be configured to transmit provisioning information 16N to any user device that has not already received provisioning information or already been provisioned. In other examples, computing device 12 may transmit provisioning information 16N responsive to sensing that user device 14N is a type of computing device compatible with provisioning information 16N. For example, computing device 12 may determine that user device 14N is a certain model or type of computing device that includes an operating system and/or components compatible with the applications to be retrieved based on provisioning information 16N.

Prior to transmitting provisioning information 16N, computing device 12 may be configured to generate the unique provisioning information for each of the plurality of users, or user accounts associated with each of the plurality of users. For example, computing device 12 may be configured to generate, based on user specific and common information, respective packets of unique provisioning information for subsequent transmission to respective user devices 14. In one example, computing device 12 may generate all of the unique provisioning information for all of the users prior to transmitting provisioning information to any user devices 14. In this manner, computing device 12 may select pre-generated unique provisioning information in response to sensing one of user devices 14. In another example, computing device may generate respective unique provisioning information in response to sensing a new user device 14. In this manner, computing device 12 may generate provisioning information, such as unique provisioning information 16N, on demand. The on demand technique for generating unique provisioning information may also allow computing device 12 to tailor the unique provisioning information to the type or model of computing device that is the sensed user device 14.

The provisioning process illustrated in the example of FIG. 1 may not be isolated to a single user device. Instead, the provisioning process may be used by computing device 12 to complete rapid provisioning of some or all of user devices 14. After computing device 12 transmits the respective unique provisioning information to user device 14A, computing device 12 may immediately transmit another set of unique provisioning information to user device 14B as soon as user device 14 is sensed within communication range. In this manner, computing device 12 may transmit the next set of unique provisioning information while user devices 14 that have already received the respective provisioning information communicate with server 22 via network 20 continue to self-provision themselves by retrieving applications and otherwise configuring themselves for use by a user. Computing device 12 may initiate the user specific provisioning process for dozens, hundreds, or even more user devices 14 in very little time. As shown in the example of FIG. 1, computing device 12 may transmit another set of unique provisioning information to another one of user devices 14 immediately after computing device 12 completes the transmission of the unique provisioning information 16N to user device 14N. During this time, user device 14N may communicate with server 22 via network 20 to configure itself based on provisioning information 16N, similar to user devices 14A and 14B.

For example, subsequent to computing device 12 transmitting the provisioning information 16N to user device 14N, computing device 12 may sense an additional one of user devices 14 (not shown) in wireless communication range of computing device 12. In response to sensing the additional one of user devices 14, computing device 14 may select an additional set of unique provisioning information associated with another user account of the plurality of user accounts. The additional set of unique provisioning information may include instructions for the additional one of user devices 14 to automatically configure itself, via network 20, with one or more applications of the additional user account associated with the user. In response to the selection, computing device 12 may transmit the additional set of unique provisioning information to the additional one of user devices 14 once the additional user device is within wireless communication range.

Computing device 12 may continue this iterative process until computing device 12 has transmitted the respective provisioning information to each of user devices 14 or provisioning information associated with each of the user accounts has been transmitted to a respective user device 14. In some examples, computing device 12 may select the additional set of unique provisioning information by moving to the next user, or user account, in a list of user accounts to be provisioned on respective user devices 14. Computing device 12 may store an indication to each user account for which provisioning information has been transmitted. If a user device 14 was not provisioning correctly, or an administrator wishes to provision only one of user devices 14 separately, computing device 12 may be configured to select a specific user account, or subset of user accounts, based on user input. Computing device 12 may then transmit unique provisioning information for the selected user account without requiring the provisioning of other user devices 14. In this manner, computing device 12 may transmit provisioning information automatically (e.g., without administrator input) to all user devices 14 or on a semi-automatic basis in which administrator input is provided to computing device 12 to control which unique provisioning information is transmitted to respective user devices 14.

Generally, computing device 12 may perform the provisioning process by transmitting different sets of unique provisioning information at different, non-overlapping, times. Since only one of user devices 14 may be in wireless communication range of computing device at any given time, each of user devices 14 may only receive unique provisioning information for a single user account associated with that unique provisioning information. For example, computing device 12 may transmit provisioning information 16B (not shown) to user device 14B during a first time period and transmit provisioning information 16N to user device 14B during a second time period that does not overlap with the first time period. In other words, the first and second time periods may be non-overlapping time periods. In alternative examples, computing device 12 may transmit different sets of unique provisioning information to respective user devices 14 at the same time while tracking the identification of each user device 14 such that each set of unique provisioning information is transmitted to only one of user devices 14.

In some examples, computing device 12 may be configured to receive a confirmation signal from a user device 14, subsequent to transmitting the respective set of unique provisioning information, confirming that the set of provisioning information was received by the user device. In response to receiving the confirmation signal, computing device 12 may be configured to indicate that the user account associated with that provisioning information has been used to provisioning a user device 14. Computing device 12 may then begin to sense for an additional user device for transmission of the next set of unique provisioning information. Computing device 12 may receive the confirmation signal via the device-to-device communication through which the provisioning information was transmitted or another communication modality.

In addition, or alternatively, computing device 12 may output a user detectable indication confirming the provisioning information was received by the respective user device. The user detectable indication may be an audible signal or visual signal configured to cue the administrator to set aside the user device 14 that sent the confirmation signal and place another user device 14 in communication range of computing device 12. In some examples, the user device 14 may output a user detectable indication that the unique provisioning information was received. The user device output of the user detectable indication may be in addition to the output from computing device 12 or instead of the user detectable indication from computing device 12.

In other examples, the confirmation signal transmitted from the user device 14 and received by computing device 12 may be an error signal indicating that there were one or more errors in the provisioning information sent by computing device 12. The error signal may be generated by user device 14 during a loss in communication during transmission of the unique provisioning information, for example. In response to receiving the error signal, computing device 12 may present an indication to the administrator that another attempt at transmission is required and/or automatically transmit the same unique provisioning information again. Alternatively, responsive to receiving the error signal, computing device 12 may mark the user account associated with the transmitted unique provisioning information as unsuccessful for a second attempt at transmission once provisioning information is transmitted to the rest of user devices 14 during the provisioning session.

Although the provisioning information transmitted by computing device 12 may be unique for each of user devices 14 in some examples, the provisioning information may be generic for all user devices 14 in other examples. When computing device 12 is configured to transmit generic provisioning information, each user device 14 may receive user input identifying a specific user account to be added to the user device after the user device has self-configured itself.

In one example, computing device 12 may sense a user device (e.g., user device 14N) in wireless communication range of computing device 12. Responsive to sensing user device 14N, computing device 12 may be configured to transmit, via wireless device-to-device communication, the provisioning information to user device 14N. The provisioning information may include one, two or more, or all of the following information: network credentials that allow user device 14N to access network 20, one or more setting values that limit a respective function of user device 14N (e.g., device policy information), an administrator password that allows an administrator to access user device 14N, and/or instructions for user device 14N to automatically configure itself, via network 20, with at least one application for use by a user.

The provisioning information may include the actual data for each of these features (e.g., the setting values) or an indication of the actual data such that user device 14 can reconstruct the actual data from the indication and/or retrieve the actual data via network 20. For example, the provisioning information may include an indication of an owner account and/or a device policy, and user device 14N may retrieve the administrator password and/or setting values related to the identified owner account or device policy from server 22. When user device 14N configures itself with at least one application for user by a user, user device 14N may initiate one or more software applications, set-up one or more functions for use, and/or download the applications or software related to the applications from server 22.

In some examples, in response to connecting with network 20 and server 22 for the first time after receiving the provisioning information, user device 12 may transmit a unique device identification number to server 22. Server 22 may then register user device 12 to the server. This server registration may allow server 22 to prompt a user to add a user account to user device 14N and/or be required by server 22 for a user account to be manually added to user device 14N.

After user device 14N is configured with the generic provisioning information, a user (e.g., a student or employee) may interact with user device 14N to enter information related to the user account of the user. In response to receiving this information from the user, user device 14N may further configure itself with information related to the user account. User account information may be separately, or manually, entered by the user in situations in which the user account is already set-up to prevent computing device 12 from either acquiring the user's password and/or requiring the user to select a new password after the old user password was used to provision user device 14N via computing device 12.

The wireless device-to-device communication used by computing device 12 to transmit the unique provisioning information (e.g., provisioning information 16N) may be any communication protocol or modality that facilitates the transfer of data directly between computing device 12 and user devices 14. In one example, the wireless device-to-device communication includes near-field communication (NFC). In this manner, computing device 12 may include an NFC unit or module configured to transmit the provisioning information to NFC units of the respective user devices 14.

Although NFC may occur in active or passive modes, active NFC configurations may be used herein. In other words, each of computing device 12 and user devices 14 may include NFC hardware or circuitry configured to produce and detect magnetic fields in accordance with the NFC protocol. Production of magnetic fields may be performed to transmit data (e.g., provisioning information 16N) and detection of the magnetic fields may be performed to receive data. When an NFC unit is functioning, it may periodically transmit a magnetic field and/or sense magnetic fields in order to sense other NFC units. Using this functionality, the NFC unit of computing device 12 may detect the NFC unit of one of user devices 14 when the user device is in communication range.

Transmission of data via NFC may occur over relatively short distances. For example, data may be transmitted over distances of less than one meter or less than 10 centimeters. This short-range for NFC data transfer may reduce the likelihood that multiple user devices 14 are in communication with computing device 12 at the same time. Additionally, a user device 14 may need to be placed within close proximity with computing device before computing device 12 can transmit the unique provisioning information. Although the user devices 14 may physically touch, bump, or tap computing device 12 to receive the respective provisioning information from computing device 12, computing device 12 may be capable of transmitting provisioning information to user devices 14 without physically touching the respective user devices 14.

In other examples, computing device 12 may be configured to transmit provisioning information over a different wireless device-to-device communication modality. For example, computing device 12 may utilize Bluetooth or other radio frequency wireless technologies. In some examples, computing device 12 may transmit the provisioning information using multiple communication modalities. For example, computing device 12 may initially establish communication with a user device 14 using NFC and then transmit the provisioning information over another communication modality, such as a Bluetooth connection.

Alternatively, the wireless device-to-device communication may not utilize radio frequency channels. Instead, the wireless device-to-device communication may include the presentation and detection of visual representations of data. In other words, computing device 12 may output for display at a display device one or more images representing the unique provisioning information for capture by the respective user device 14. In this manner, computing device may transmit provisioning information by presenting, via the display device of computing device 12, one or more visual representations of the unique provisioning information for detection by an optical sensor of one of user devices 14. For example, an administrator may physically position the optical sensor (e.g., a camera) of the user device with respect to the display device of computing device 12 to obtain an image of the presented visual representation(s).

Example visual representations of the unique provisioning information may include one-dimensional bar codes, two-dimensional bar codes (e.g., quick response codes (QR codes) or quick shot codes), or any other types of images configured to encode information. When the provisioning information contains too much data for a single visual representation, computing device 12 may present a set of multiple visual representations at once or in series. In some examples, the multiple visual representations may contain markers indication the order in which the multiple visual representations should be interpreted.

In the example of computing device 12 and user devices 14 being mobile computing devices (e.g., tablet computing devices or smartphone computing devices), the placement of optical sensors within each device may provide various physical orientations with which to present and obtain the data. If user devices 14 only include an optical sensor on a back surface opposing a display surface of the device, the administrator may position the back of the user device to the display device of computing device to allow the optical sensor to obtain an image of the visual representation presented by computing device 12.

If both computing device 12 and a user device 14 include respective optical sensors on the same surface, or facing the same direction, as the respective display devices, computing device 12 may be physically oriented to face the user device 14 to engage in a visual communication session with the user device 14. For example, computing device 12 may present the visual representation of the unique provisioning information on the display device of computing device 12. The user device 14 may subsequently obtain an image of the visual representation using an optical sensor. In response to obtaining the image, the user device 14 may present a visual representation of a confirmation signal at the user device display to signal that the unique provisioning information was received. Computing device 12 may then obtain the visual representation of the confirmation signal using the optical sensor of computing device 12. This exchange of visual representations may continue until all of the one or more visual representations of the unique provisioning information have been transferred. Computing device 12 and/or the user device 14 may be configured to output an audible or visual signal indicating the transmission of provisioning information is complete, prompting the administrator to obtain another user device 14 for provisioning.

Although wireless communication is generally described herein for transmitting provisioning information, wired communication may be utilized in alternative examples. For example, computing device 12 may transmit unique provisioning information via universal serial bus (USB), wired Ethernet connection, or any other non-wireless communication channel.

User devices 14 may generally connect to network 20 via an access point or other device different from computing device 12. However, computing device 12 may act as a wireless access point for one or more user devices 14 in alternative examples. For example, computing device 12 may transmit the unique provisioning information via NFC, and user devices 14 may wirelessly connect back to computing device 12 using wireless networking protocols such as one of the IEEE 802.11 standards or any other protocol to access network 20 and server 22 to perform the self-provisioning process. In another example, computing device 12 may use the same communication protocol to transmit the provisioning information to a user device 14 and allow the user device to subsequently access network 20. In any case, computing device 12 may be configured to act as a wireless access point for network 20 in some examples.

Retrieval of data from server 22 and/or repository 24, or transmission of data to such devices, during the provisioning process may require a connection between user devices 14 and networked server 22 using network 20. Both user devices 14 and networked server 22 may connect to network 20. Network 20 may be embodied as one or more of the Internet, a wireless network, a wired network, a cellular network, or a fiber optic network. In other words, network 20 may be any data communication protocol or protocols that facilitate data transfer between two or more devices. Networked server 22 may also connect to repository 24 for storing account information (e.g., owner accounts, user accounts, etc.) and/or applications or other information associated with such accounts and that may be used when each of user devices 14 are configuring themselves during the provisioning process.

Networked server 22 and repository 24 may each include one or more servers or databases, respectively. In this manner, networked server 22 and repository 24 may be embodied as any hardware necessary to provide information to each of user devices 14 during after receiving the respective unique provisioning information from computing device 12. Networked server 22 may include one or more servers, desktop computers, mainframes, minicomputers, or other computing devices capable of executing computer instructions and storing data. In some examples, functions attributable to networked server 22 herein may be attributed to respective different servers for respective functions. Repository 24 may include one or more memories, repositories, hard disks, or any other data storage device. In some examples, repository 24 may be included within networked server 22.

Repository 24 may be included in, or described as, cloud storage. In other words, account information or other information associated with owner and/or user accounts may be stored in one or more locations in the cloud (e.g., one or more repositories 24). Networked server 22 may access the cloud and retrieve the appropriate applications or setting values, for example, corresponding to the owner and/or user accounts of each user device 14. In some examples, repository 24 may include Relational Database Management System (RDBMS) software. In one example, repository 24 may be a relational database and accessed using a Structured Query Language (SQL) interface that is well known in the art. Repository 24 may alternatively be stored on a separate networked computing device and accessed by networked server 22 through a network interface or system bus. Repository 24 may in other examples be an Object Database Management System (ODBMS), Online Analytical Processing (OLAP) database or other suitable data management system.

Various aspects of the disclosure may be operable only when respective users have explicitly enabled such functionality. For example, in the instance where the user has consented to the use of any data, e.g., a user account for provisioning a respective user device, the data may be used to configure the respective user device for future use by the user. The user may consent or revoke consent to the collection and/or transmission of any data at any time.

In addition, various aspects of the disclosure may be disabled by the user. Thus, a user may elect to prevent an associated user device 14 from collection and/or transmitting location information associated with the user device, obtained images, or any other information related to the actions of the user device. In addition, the user may prevent a user device from transmitting information identifiable of the user without confirmation. Moreover, an administrator for an entity of the owner account associated with each user device 14 may similarly consent to the use of any data and/or revoke consent to the use of such data for one or more of the users. User devices 14 may present one or more respective screens requesting that the user elect to transmit any or all information. In this manner, the user may control what information, if any, is transmitted to a network server or other computing device. More generally, privacy controls may be applied to all aspects of the disclosure based on a user's privacy preferences to honor the user's, or administrator's privacy preferences related to the use of computing device 12, any user device 14, or any other computing device or functionality described in this disclosure.

Figure 2:
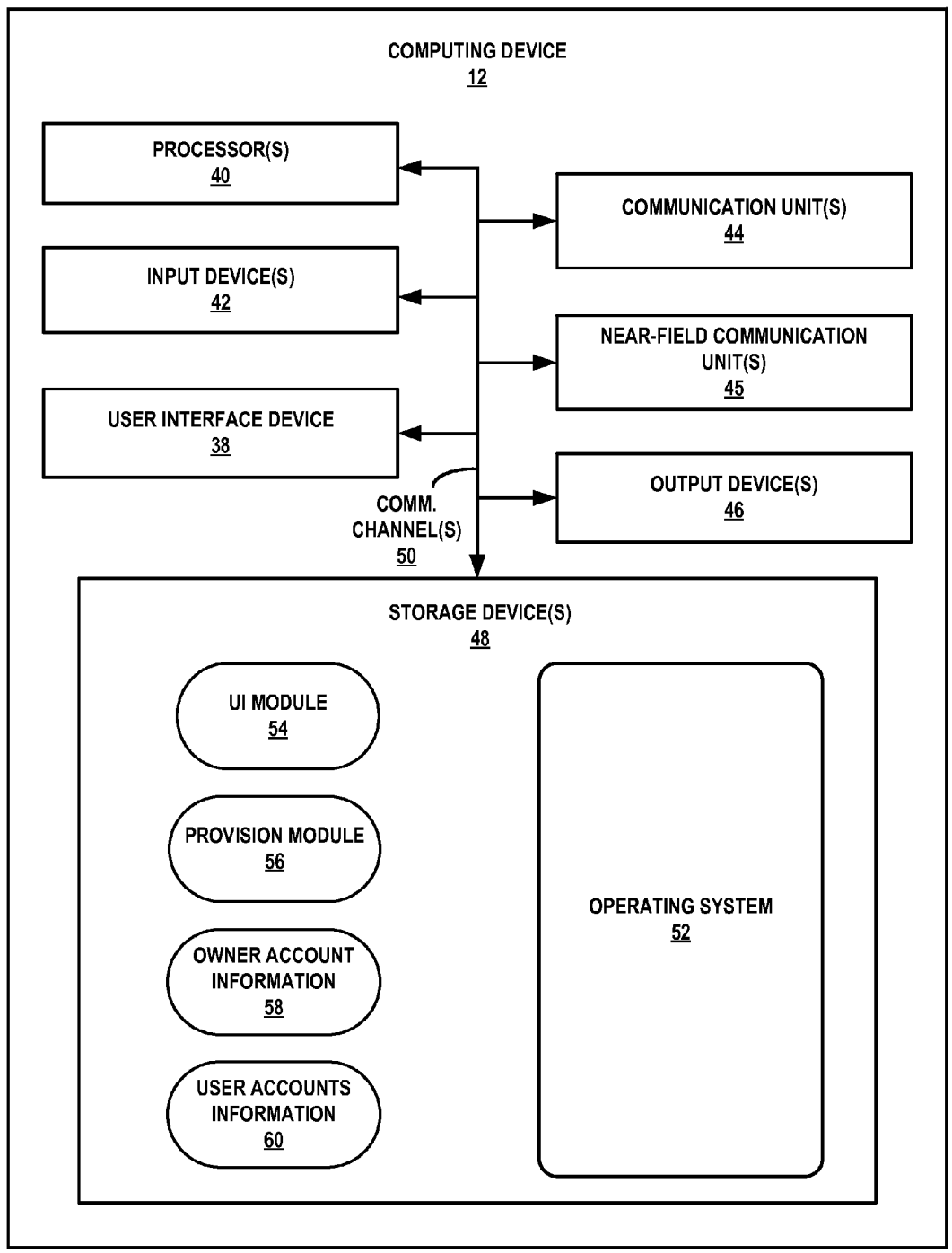
FIG. 2 is a block diagram of the example computing device of FIG. 1.

FIG. 2 is a block diagram of the example administrator computing device 12 of FIG. 1. Computing device 12 of FIG. 2 is described below within the context of FIG. 1. In other examples, computing device 12 can include fewer, additional, or different components compared to those illustrated in FIG. 2. For example, although user interface device 38 ("UID 38") is shown in FIG. 2 as being integral with computing device 12, in other implementations, UID 38 may be operably coupled to computing device 12, e.g., by a wired or wireless data connection.

As shown in the example of FIG. 2, computing device 12 includes UID 38, one or more processors 40, one or more input devices 42, one or more communication units 44, near-field communication unit(s) (NFC units) 45, one or more output devices 46, and one or more storage devices 48. In this example, storage devices 48 of computing device 12 also various modules and information such as UI module 54, provision module 56, owner account information 58, user accounts information 60, and operating system 52. Communication channels 50 may interconnect each of the components 40, 42, 44, 45, 46, 48, 52, 54, 56, 58, and 60 for inter-component communications (physically, communicatively, and/or operatively). In some examples, communication channels 50 may include a system bus, a network connection, an inter-process communication data structure, or any other method for communicating data.

One or more input devices 42 of computing device 12 may receive input. Examples of input are tactile, audio, and video input. Input devices 42 of computing device 12, in one example, includes a presence-sensitive display, touch-sensitive screen, mouse, keyboard, voice responsive system, video camera, microphone or any other type of device for detecting input from a human or machine. A presence-sensitive display may include both a presence-sensitive input device and a display device. In addition, input devices 42 may include one or more optical sensors, such as a digital camera. The one or more optical sensors may obtain images of visual representations of confirmation input from user devices, for example. A microphone may obtain audio information when activated by computing device 12.

In one example, input devices 42 may include rear and/or front facing cameras configured to capture images (e.g., still images and/or video) of the environment surrounding computing device 152 such as people, landscapes, objects, or visual representations presented by other computing devices. Each camera may include one or more optical sensors capable of generating high-resolution images. For example, the optical sensor may include more than one million pixels (a one megapixel sensor), more than five million pixels (a five megapixel sensor), or even more than ten million pixels (a ten megapixel sensor). In some examples, computing device 12 may include two or more cameras disposed on any surface of computing device 12 or coupled to computing device 12 using a cable.

One or more output devices 46 of computing device 12 may generate output. Examples of output are tactile, audio, and video output. Output devices 46 of computing device 12, in one example, a display device such as a presence-sensitive display (which may include a display device), sound card, video graphics adapter card, speaker, cathode ray tube (CRT) monitor, liquid crystal display (LCD), or any other type of device for generating output to a human or machine.

One or more communication units 44 of computing device 12 may communicate with external devices (e.g., a networked server such as networked server 22 of FIG. 1) via one or more networks (e.g., network 20 of FIG. 1) by transmitting and/or receiving network signals on the one or more networks. For example, computing device 12 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

NFC unit 45 may be configured to transmit and/or receive communication signals in accordance with NFC protocols. For example, NFC unit 45 may be configured to operate as an active NFC module that sends and receives signals and/or emulate a passive NFC module by only transmitting signals in response to receiving a magnetic field from an NFC unit of another device (e.g., an NFC unit of a user computing device). Although NFC unit 45 may be different than communication units 44, communication units 44 may include NFC unit 45 in other examples.

UID 38 of FIG. 2 may include a presence-sensitive display. Computing device 12 may use the presence-sensitive display as an input device and an output device. For example, the presence-sensitive display of UID 38 may include a touchscreen (e.g., a presence-sensitive input device) configured to receive tactile user input from a user of computing device 12. The presence-sensitive display of UID 38 may also include a light emitting diode (LED) display (e.g., a display device) capable of outputting visible information to the user of computing device 12. UID 38 may present a user interface on the presence-sensitive display, which may be related to functionality provided by computing device 12 (e.g., transmitting unique provisioning information to respective user computing devices). For example, the presence-sensitive display of UID 38 may present various functions and applications, such as lists of user accounts, applications related to management and control of one or more user device, or any other functions related to the use of computing device 12 by an administrator for an entity. In another example, the presence-sensitive display of UID 38 may present a menu of options related to the function and operation of computing device 12, such as screen brightness and other configurable device settings.

In some examples, the presence-sensitive display may detect an object at and/or near the screen of the presence-sensitive display. As one non-limiting example range, a presence-sensitive display may detect an object, such as a finger or stylus, which is within 2 inches or less of the physical screen of the presence-sensitive display. The presence-sensitive display may determine a location (e.g., an (x,y) coordinate) of the presence-sensitive display at or near which the object was detected. In another non-limiting example range, a presence-sensitive display may detect an object 6 inches or less from the physical screen of the presence-sensitive display, and other exemplary ranges are also possible. The presence-sensitive display may determine the location selected by the object (e.g., user's finger) using capacitive, inductive, and/or optical recognition techniques. In some examples, the presence-sensitive display provides output using tactile, audio, or video stimuli as described with respect to output device 46.

One or more storage devices 48 within computing device 12 may store information required for use during operation of computing device 12. Storage devices 48, in some examples, have the primary purpose of being short term and not long-term computer-readable storage mediums. Storage devices 48 on computing device 12 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EE- PROM) memories. Storage devices 48 may store program instructions and/or data associated with UI module 54, provision module 56, owner account information 58, user accounts information 60, operating system 52, or any other information or data related to the provisioning of user devices as described herein.

One or more processors 40 may implement functionality and/or execute instructions within computing device 12. For example, processors 40 on computing device 12 may read and execute instructions stored by storage devices 48 that execute the functionality of UI module 54 and provision module 56. These instructions executed by processors 40 may cause computing device 12 to store information within storage devices 48 during program execution, such as notifications, notification objects, and/or information associated with provision module 56. Processors 40 may execute instructions of modules 54, 56, 58, and 60 to transmit unique provisioning information to and/or manage each of a plurality of user computing devices (e.g., user devices 14 of FIG. 1). That is, modules 54, 56, 58, and 60 may be operable by processors 40 to perform various actions, including generating and transmitting unique provisioning information. In other examples, one or more processors 40 may execute instructions of any of modules 54, 56, 58, and 60 to request a networked server to at least partially perform any of the functions attributed to modules 54, 56, 58, and 60 herein.

UI module 54 may control the graphical user interface that is presented by a display device or other components of output devices 46. For example, UI module 54 may output graphical information to represent the received account information, user accounts and/or user devices that have received provisioning information, status information regarding the transfer of provisioning information and/or the subsequent self-provisioning of each user device, or any other information related to the features described herein.

Provision module 56 may perform the functionality described herein with regard to initiating the provisioning process for each user device. For example, provisioning module 56 may manage the receipt of account information (e.g., from server 22 or some other source of the user and/or owner account), generation of unique provisioning information, sensing when a user device is in communication range of computing device 12, and/or transmitting the unique provisioning information to the user device in communication range of computing device 12. Provisioning module 56 may perform these functions, and any other functions related to the provisioning process, based on instructions stored in storage devices 48 or obtainable via network 20. In this manner, provisioning module 56 may control computing device through the provisioning process of transmitting unique provisioning information to respective user devices. Provisioning module 56 may also, in some examples, manage the collection of data and management of the result of the self-provisioning performed by each user device.

Owner account information 58 may store an indication of one or more owner accounts and/or copies of the one or more owner accounts. The owner account may be the account associated with computing device 12 and the entity that may manage the operation of each user device. Although computing device 12 may also be at least partially controlled by the owner account, computing device 12 may not be associated with the owner account in other examples. The owner account may not typically be accessed or modified by a user associated with a user account. In this manner, each user account may be subordinate to the owner account.

User accounts information 60 may include a plurality of accounts associated with respective users. Typically, one user account may be associated with a single user. However, one user account may be associated with two or more users that will share use of the user device to be configured with the user account. User accounts information 60 may be stored as a list or in another database, and user accounts information 60 may store indicates of each user account, various information regarding the user account (e.g., the associated user, classes to which the user is enrolled, supervisor(s) for the user, a type of user device to be provisioned with the user account, or any other associated information).

In some examples, storage devices 48 may also store device policy information that sets one or more limitations on functionalities of the user devices and/or user accounts. The device policy information may be associated or tied to the owner account to maintain consistent settings across some or all of the user devices. In other examples, each of two or more device policies may be associated with respective user accounts. Although each set of unique provisioning information may include an indication of each of an owner account, a user account, and device policy information, other examples of provisioning information may include more or less data.

Although the components of computing device 12 are illustrated in the example of FIG. 2 as within a common housing, one or more components may instead be wired or wirelessly tethered to computing device 12. For example, output device 46 (e.g., a display device) may be physically separate from computing device 12. In other examples, an optical sensor may not reside within a housing of computing device 12.

Figure 3:
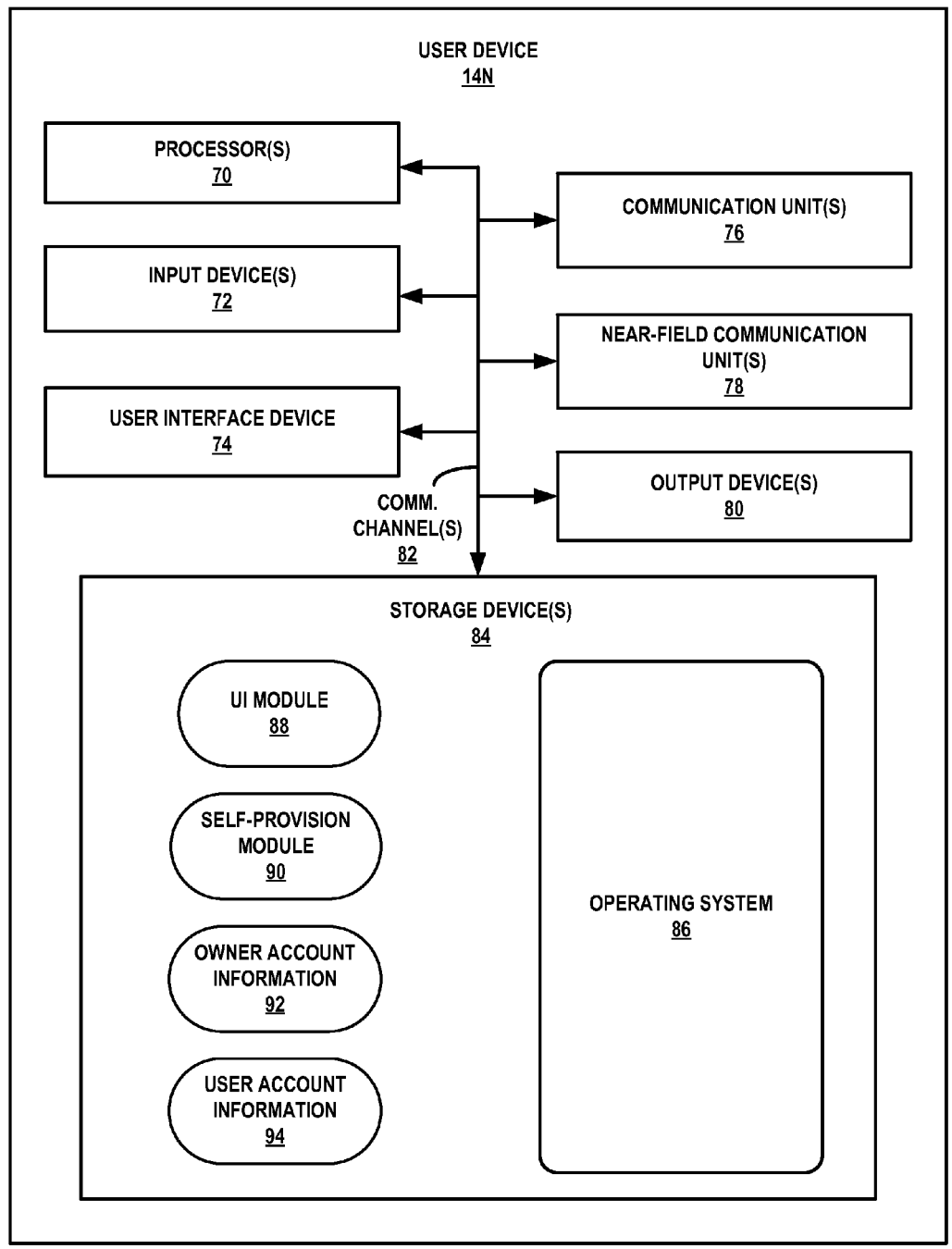
FIG. 3 is a block diagram of an example user device of FIG. 1.

FIG. 3 is a block diagram of example user device 14N of FIG. 1. User device 14N of FIG. 3 is described below within the context of FIG. 1. User device 14N is an example of user devices 14 of FIG. 1, and other user devices 14 may include similar components and perform similar functions. In addition, user device 14N may have similar components to that of computing device 12 of FIGS. 1 and 2. User device 14N can include fewer, additional, or different components compared to those illustrated in FIG. 3. For example, although user interface device 74 ("UID 74") is shown in FIG. 3 as being integral with user device 14N, in other implementations, UID 74 may be operably coupled to user device 14N, e.g., by a wired or wireless data connection.

As shown in the example of FIG. 3, user device 14N includes UID 74, one or more processors 70, one or more input devices 72, one or more communication units 76, near-field communication unit(s) (NFC units) 78, one or more output devices 80, and one or more storage devices 84. In this example, storage devices 84 of user device 14N also various modules and information such as UI module 88, self-provision module 90, owner account information 92, user account information 94, and operating system 86. Communication channels 82 may interconnect each of the components 70, 72, 76, 78, 80, 84, 86, 88, 56, 92, and 94 for inter-component communications (physically, communicatively, and/or operatively). In some examples, communication channels 82 may include a system bus, a network connection, an inter-process communication data structure, or any other method for communicating data.

One or more input devices 72 of computing device 12 may receive input. Examples of input are tactile, audio, and video input. Input devices 72 of computing device 12, in one example, includes a presence-sensitive display, touch-sensitive screen, mouse, keyboard, voice responsive system, video camera, microphone or any other type of device for detecting input from a human or machine. A presence-sensitive display may include both a presence-sensitive input device and a display device. In addition, input devices 72 may include one or more optical sensors, such as a digital camera. The one or more optical sensors may obtain images of visual representations of unique provisioning information 16N, for example, from administrator computing device 12. A microphone may obtain audio information when activated by user device 14N.

In one example, input devices 72 may include rear and/or front facing cameras configured to capture images (e.g., still images and/or video) of the environment surrounding computing device 186 such as people, landscapes, objects, or visual representations presented by other computing devices. Each camera may include one or more optical sensors capable of generating high-resolution images. For example, the optical sensor may include more than one million pixels (a one megapixel sensor), more than five million pixels (a five megapixel sensor), or even more than ten million pixels (a ten megapixel sensor). In some examples, user device 14N may include two or more cameras disposed on any surface of user device 14N or coupled to user device 14N using a cable.

One or more output devices 80 of user device 14N may generate output. Examples of output are tactile, audio, and video output. Output devices 80 of user device 14N, in one example, a display device such as a presence-sensitive display (which may include a display device), sound card, video graphics adapter card, speaker, cathode ray tube (CRT) monitor, liquid crystal display (LCD), or any other type of device for generating output to a human or machine.

One or more communication units 76 of user device 14N may communicate with external devices (e.g., a networked server such as networked server 22 of FIG. 1) via one or more networks (e.g., network 20 of FIG. 1) by transmitting and/or receiving network signals (e.g., retrieve applications and/or transmit provisioning-related information during the self-provisioning process) on the one or more networks. For example, user device 14N may use communication unit 76 to transmit and/or receive radio signals on a radio network such as a cellular radio network. Likewise, communication units 76 may transmit and/or receive satellite signals on a satellite network such as a GPS network. Examples of communication unit 76 include a network interface card (e.g. such as an Ethernet card), an optical transceiver, a radio frequency transceiver, a GPS receiver, or any other type of device that can send and/or receive information. Other examples of communication units 76 may include Bluetooth®, GPS, 3G, 4G, and Wi-Fi® radios found in mobile devices as well as Universal Serial Bus (USB) controllers.

NFC unit 78 may be configured to transmit and/or receive communication signals in accordance with NFC protocols. For example, NFC unit 78 may be configured to operate as an active NFC module that sends and receives signals and/or emulate a passive NFC module. NFC unit 78 may be configured to be active upon powering up user device 14N such that user device 14N is detectable by the administrator computing device 12 and receive unique provisioning information 16N. Although NFC unit 78 may be different than communication units 76, communication units 76 may include NFC unit 78 in other examples.

UID 74 of FIG. 3 may include a presence-sensitive display. User device 14N may use the presence-sensitive display as an input device and an output device. For example, the presence-sensitive display of UID 74 may include a touchscreen (e.g., a presence-sensitive input device) configured to receive tactile user input from a user of user device 14N. The presence-sensitive display of UID 74 may also include a light emitting diode (LED) display (e.g., a display device) capable of outputting visible information to the user of user device 14N. UID 74 may present a user interface on the presence-sensitive display, which may be related to functionality provided by user device 14N (e.g., receiving unique provisioning information from computing device 12 and/or presenting status updates for the self-provisioning process).

One or more storage devices 84 within user device 14N may store information required for use during operation of user device 14N. Storage devices 84, in some examples, have the primary purpose of being short term and not long-term computer-readable storage mediums. Storage devices 84 on user device 14N may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 84 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 84 may store program instructions and/or data associated with UI module 88, self-provision module 90, owner account information 92, user accounts information 94, operating system 86, or any other information or data related to the provisioning of user devices as described herein.

One or more processors 70 may implement functionality and/or execute instructions within user device 14N (or other user devices to self-provision themselves). For example, processors 70 on user device 14N may read and execute instructions stored by storage devices 84 that execute the functionality of UI module 88 and self-provision module 90. These instructions executed by processors 70 may cause user device 14N to store information within storage devices 84 during program execution, such as notifications, notification objects, and/or information associated with self-provision module 90. Processors 70 may execute instructions of modules 88, 56, 92, and 94 to receive and store unique provisioning information for subsequent self-provisioning activities such as retrieving applications and/or setting values associated with one or more accounts of the unique provisioning information. That is, modules 88, 56, 92, and 94 may be operable by processors 70 to perform various actions, including receiving unique provisioning information and conducting the self-provisioning process. In other examples, one or more processors 70 may execute instructions of any of modules 88, 56, 92, and 94 to request a networked server to at least partially perform any of the functions attributed to modules 88, 56, 92, and 94 herein.

UI module 88 may control the graphical user interface that is presented by a display device or other components of output devices 80. For example, UI module 88 may output graphical information to represent the received unique provisioning information, network 20 access status, applications and/or setting values retrieved from sever 22, or any other activities related to the self-provisioning functions of user device 14N. In addition, UI module 88 may control the graphical user interface according to any other applications or instructions during use of user device 14N by the associated user.

Self-provision module 90 may perform the functionality described herein with regard to the self-provisioning process performed in response to receiving the unique provisioning information from computing device 12. The self-provisioning process is the process in which self-provisioning module 90 of user device 14N performs automatic configuration of user device 14N in accordance with the received unique provisioning information. For example, based on the instructions of the unique provisioning information, self-provisioning module 90 may control user device 14N to connect to network 20 and retrieve one or more applications, setting values, or any other information from sever 22 and/or repository 24. Self-provisioning module 90 may install any software components, applications, or other modules based on the retrieved applications or setting values.

When self-provisioning module 90 completes the self-provisioning process, user device 14N may have been changed from a generic user device with generic software to a user-specific device with user-specific software ready for use by the end-user. In other words, prior to the self-provisioning process being performed on any device, the data and/or software stored on user device 14N may be substantially identical to the data and/or software stored on any other user devices 14 (e.g., user devices 14A and 14B). After each user device 14 performs the self-provisioning process, each of user devices 14 may have different data and/or software that are personalized to the user account indicated by the respective unique provisioning information.

Owner account information 92 may store an indication of the owner account associated with user device 14N. In some examples, owner account information 92 may also store one or more setting values that controls, enables, or limits various functions of user device 14N. User account information 94 may store an indication of the user account associated with the user of user device 14N. Although user device 14N may be associated with only one user account in some examples, user device 14N may be associated with two or more user accounts in other examples. User device 14N may confine each of the multiple user accounts to separate operating environments (e.g., user device 14N may only operate according to one user account at a time). User account information 94 may store one or more setting values that controls, enables, or limits, various functions, applications, or any other services executable by user device 14N. In response to any changes that the user makes to user account information 94, user device 14N may communicate with server 22 via network 20 to reflect user account information stored in repository 24.

Storage devices 84 may also store device policy information that sets one or more limitations on functionalities of user device 14N. The device policy may set various settings to control what functions are available or blocked for the user. In this manner, the device policy may be managed by the owner account and used to limit what components are enabled (e.g., one or more cameras) and/or what functionalities are available to the user. In some examples, the device policy may be associated with the owner account such that any changes to the owner account may be reflected in the device policy. The device policy may be transmitted to user device 14N as part of the unique provisioning information or retrieved from server 22 during the self-provisioning process.

Although the components of user device 14N are illustrated in the example of FIG. 3 as within a common housing, one or more components may instead be wired or wirelessly tethered to user device 14N. For example, output devices 80 (e.g., a display device) may be physically separate from user device 14N. In other examples, an optical sensor may not reside within a housing of user device 14N.

Figure 4:
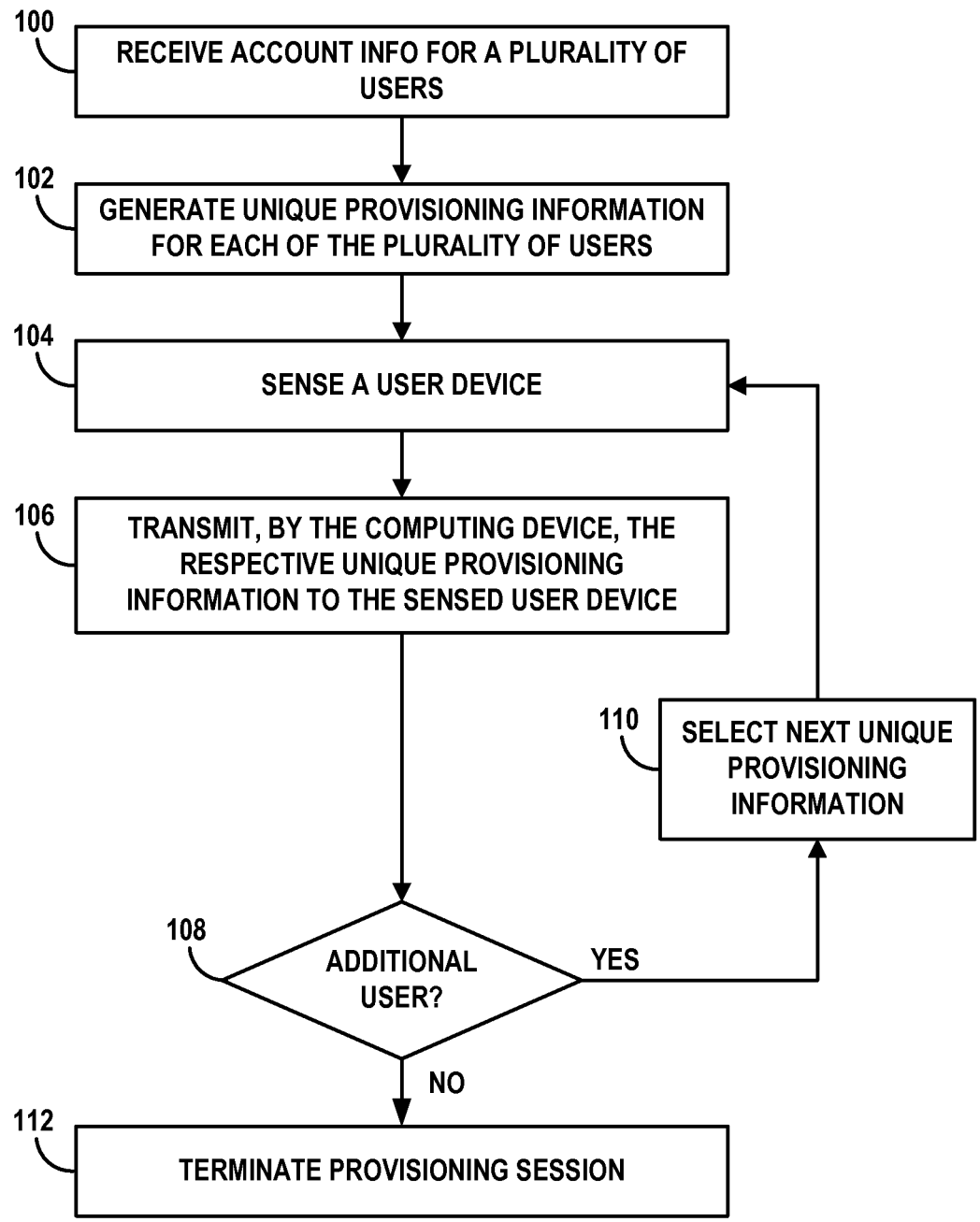
FIG. 4 is a flow diagram illustrating an example process for transmitting provisioning information to one or more user devices.

FIG. 4 is a flow diagram illustrating an example process for transmitting provisioning information to one or more user devices, in accordance with one or more aspects of the present disclosure. An administrator computing device, such as computing device 12 described in FIGS. 1 and 2, may perform the process of FIG. 4. In some instances, one or more processors of a computing device, such as processors 40 (including provisioning module 56) of computing device 12 of FIGS. 1 and 2, may also perform the process of FIG. 4. For purposes of illustration, FIG. 4 is described below within the context of computing device 12 of FIGS. 1 and 2 and user device 14N of FIGS. 1 and 3.

As shown in FIG. 4, computing device 12 may be powered on and, in some examples, processors 40 may be executing a provisioning session application configured to transmit unique provisioning information to user devices. Computing device 12, via the provisioning session application, may receive various user input configuring one or more aspects of the provisioning process (e.g., select how computing device 12 will sense each user device 14 and/or select the type of device-to-device communication for transmission of the provisioning information) or the provisioning information (e.g., the types of information to be included in the provisioning information). Processors 40 may receive account information for a plurality of users (100). The account information may be received from server 22 via network 20, another computing device, or a predetermined list of accounts. In some examples, the account information may include or indicate respective user accounts. In addition, the account information may include an owner account for the entity that will manage at least some of the user devices.

Processors 40 may also generate unique provisioning information for each of the plurality of users associated with the respective user accounts (102). Generation of each set of unique provisioning information may include creating indications of a user account, an owner account, and, in some examples, a device policy. Although processors 40 may generate sets of unique provisioning information prior sensing any user device, processors 40 may generate each set of unique provisioning information in response to sensing the respective user device.

After processors 40 initiate the provisioning process (e.g., in response to receiving a user input from an administrator requesting initiation of the provisioning process), processors 40 may sense a user device (e.g., user device 14N) when user device 14N is within communication range of computing device 12 (104). Responsive to sensing user device 14N, processors 40 may transmit, via NFC unit 45, the respective set of unique provisioning information to the sensed user device 14N (106). In other examples, processors 40 may transmit the set of unique provisioning information via another communication modality. Once user device 14N receives the unique provisioning information, user device 14N may automatically configure itself by connecting to a network and communication with a server as identified by the instructions of the unique provisioning information.

If processors 40 determine that there is another user with associated unique provisioning information to be transmitted to a user device ("YES" branch of block 108), processors 40 may select the next set of unique provisioning information (110) and sense the next user device (104). If processors 40 determine that there are no more users and associated sets of unique provisioning information ("NO" branch of block 108), processors 40 may terminate the provisioning session (112). Even though processors 40 may terminate the provisioning session, one or more of user devices 14 may continue to configure themselves during the self-provisioning process. In some examples, computing device 12 may receive status updates related to which user devices 14 have completed the self-provisioning process and are associated with which user accounts, and computing device 12 may output those status updates for display.

Figure 5:
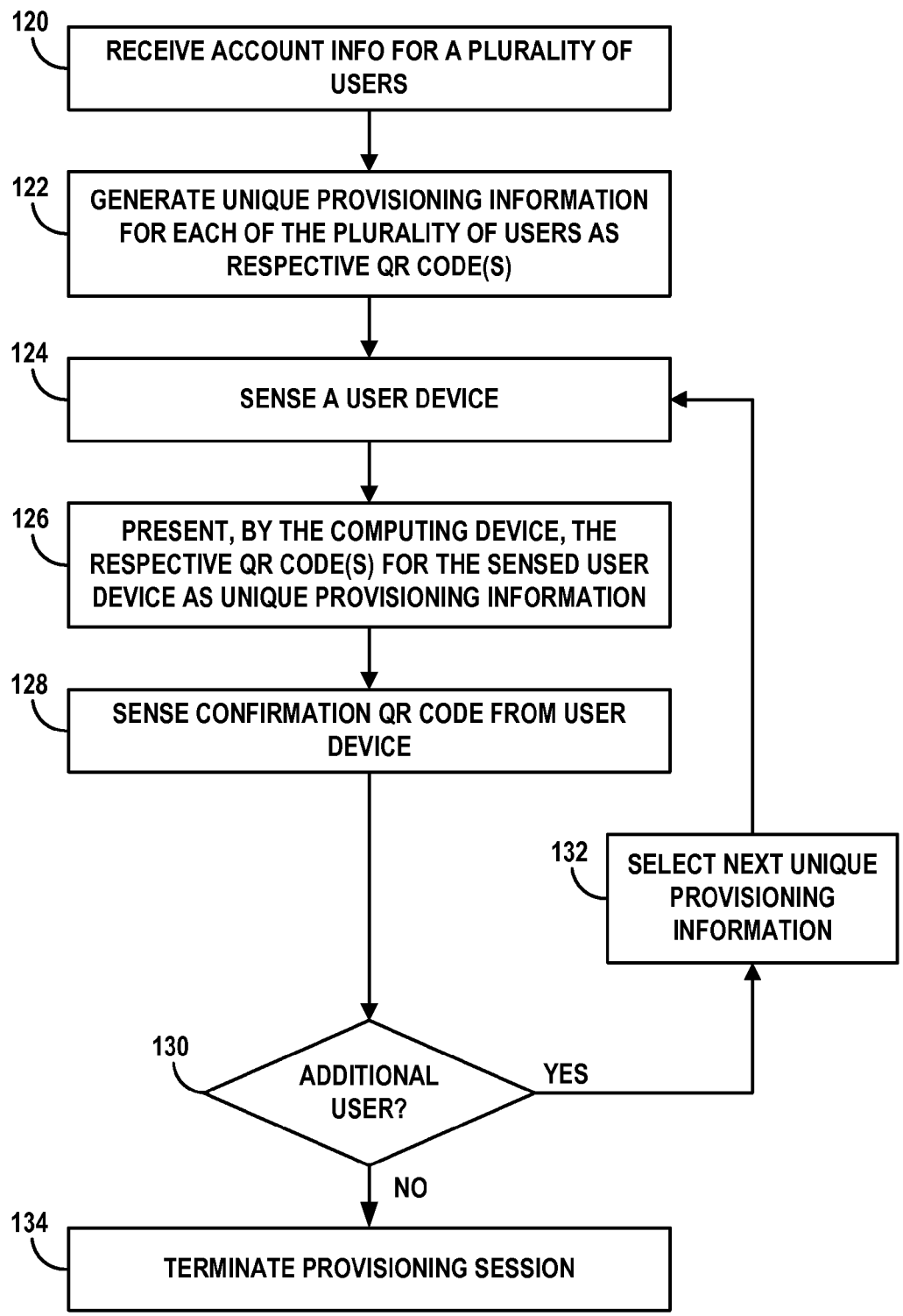
FIG. 5 is a flow diagram illustrating an example process for transmitting provisioning information to one or more user devices using optical codes.

FIG. 5 is a flow diagram illustrating an example process for transmitting provisioning information to one or more user devices using optical codes, in accordance with one or more aspects of the present disclosure. The process of FIG. 5 may be similar to the process of FIG. 4, but visual representations (e.g., optical codes) may be used to transmit the unique provisioning information. An administrator computing device, such as computing device 12 described in FIGS. 1 and 2, may perform the process of FIG. 5. In some instances, one or more processors of a computing device, such as processors 40 (including provisioning module 56) of computing device 12 of FIGS. 1 and 2, may also perform the process of FIG. 4. For purposes of illustration, FIG. 4 is described below within the context of computing device 12 of FIGS. 1 and 2 and user device 14N of FIGS. 1 and 3.

As shown in FIG. 5, computing device 12 may be powered on and, in some examples, processors 40 may be executing a provisioning session application configured to transmit unique provisioning information to user devices. Processors 40 may receive account information for a plurality of users (120). The account information may be received from server 22 via network 20, another computing device, or a predetermined list of accounts. In some examples, the account information may include or indicate respective user accounts. In addition, the account information may include an owner account for the entity that will manage at least some of the user devices.

Processors 40 may also generate unique provisioning information for each of the plurality of users associated with the respective user accounts (122). Generation of each set of unique provisioning information may include creating indications of a user account, an owner account, and, in some examples, a device policy. Although processors 40 may generate sets of unique provisioning information prior sensing any user device, processors 40 may generate each set of unique provisioning information in response to sensing the respective user device. In addition, generation of the sets of unique provisioning information may include generating visual representations, or optical codes (e.g., two-dimensional QR codes), of the unique provisioning information for presentation to respective user devices 14.

After processors 40 initiate the provisioning process (e.g., in response to receiving a user input from an administrator requesting initiation of the provisioning process), processors 40 may sense a user device (e.g., user device 14N) when user device 14N is within communication range of computing device 12 (124). Sensing of user device 14N may include capturing an image of user device 14N by an optical sensor. Responsive to sensing user device 14N, processors 40 may transmit the unique provisioning information by presenting, via a display device, the respective one or more visual representations (e.g., QR codes) for the sensed user device 14N (126). The one or more visual representations may be representative of the data for the unique provisioning information.

Once computing device 12 presents the visual representations of the unique provisioning information, user device 14N may obtain an image of the visual representations by an optical sensor. User device 14N may then analyze the obtained image and extract the unique provisioning information from the visual representations. In response to extracting the unique provisioning information, user device 14N may automatically configure itself by connecting to a network and communication with a server as identified by the instructions of the unique provisioning information. User device 14N may also generate and present a confirmation QR code (or any other visual representation of a confirmation signal) for detection by computing device 12. Processors 40 may then capture, or sense, the confirmation QR code via an optical sensor (128). Although the confirmation signal may indicate that computing device 12 can prepare to transmit the next unique provisioning information to the user device 14, user device 14N may not transmit the conformation signal in other examples.

If processors 40 determine that there is another user with associated unique provisioning information to be transmitted to a user device ("YES" branch of block 130), processors 40 may select the next set of unique provisioning information (132) and sense the next user device (124). If processors 40 determine that there are no more users and associated sets of unique provisioning information ("NO" branch of block 130), processors 40 may terminate the provisioning session (134). Even though processors 40 may terminate the provisioning session, one or more of user devices 14 may continue to configure themselves during the self-provisioning process. In some examples, computing device 12 may receive status updates related to which user devices 14 have completed the self-provisioning process and are associated with which user accounts, and computing device 12 may output those status updates for display.

FIGS. 4 and 5 are described such that computing device 12 is configured to generate and send provisioning information unique to each of user devices 14. In other examples, the processes of FIGS. 4 and 5 may be performed such that computing device 12 is configured to transmit provisioning information that is generic, or not unique, to each of user devices 14. For example, responsive to sensing user device 14N, computing device 12 may be configured to transmit, via wireless device-to-device communication, the provisioning information to user device 14N. The provisioning information may include one, two or more, or all of the following information: network credentials that allow user device 14N to access network 20, one or more setting values or configuration parameters that limit a respective function of user device 14N (e.g., device policy information), an administrator password that allows an administrator to access user device 14N, and/or instructions for user device 14N to automatically configure itself, via network 20, with at least one application for use by a user. In this manner, computing device 12 may be configured to iteratively sense and transmit the provisioning information, without selecting different sets of provisioning information for each user device 14. In response to receiving the generic provisioning information, each of user devices 14 may connect to network 20 and configure itself, via network 20, such that a user may use a respective one of user devices 14 and manually enter the appropriate user account.

Figure 6:
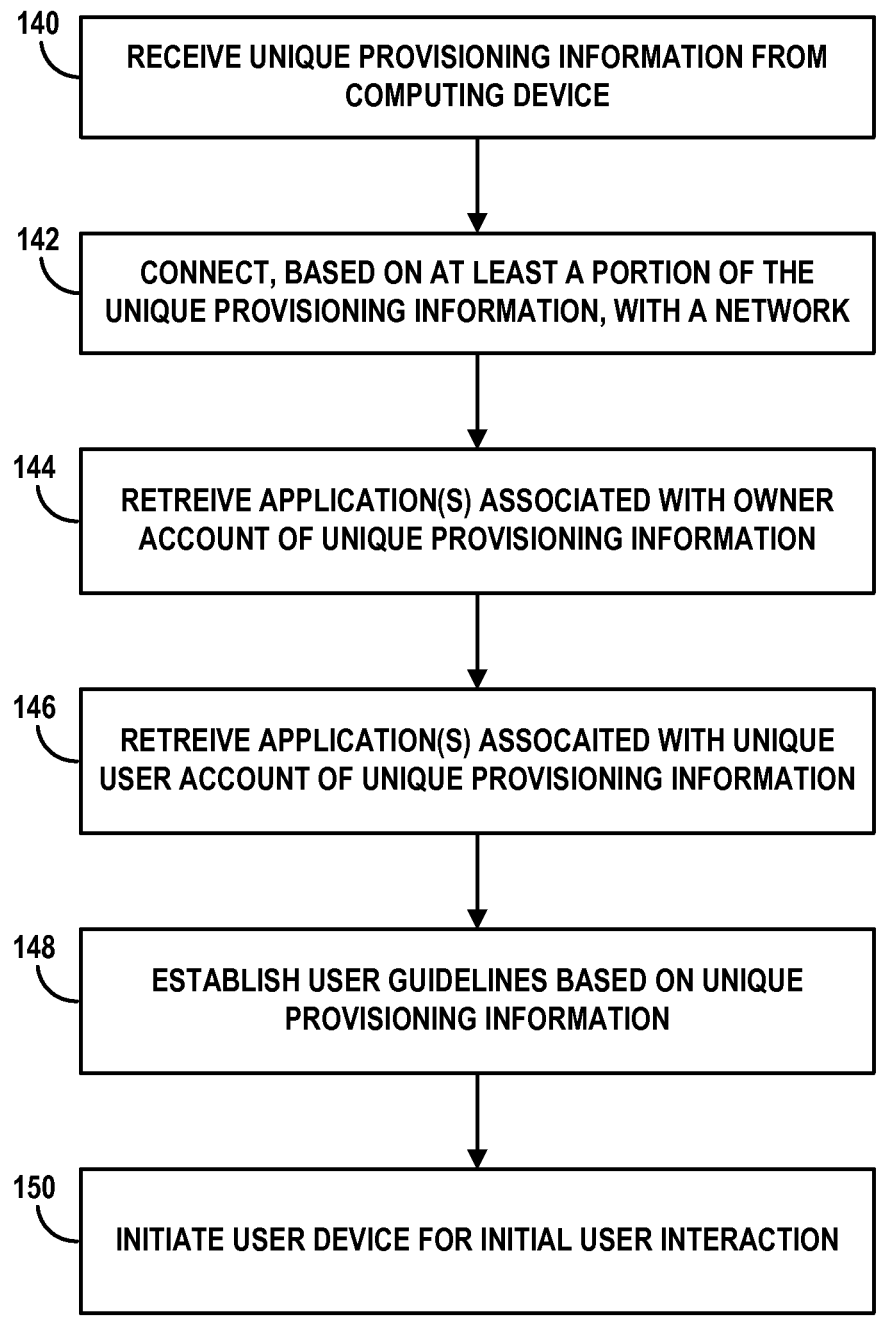
FIG. 6 is a flow diagram illustrating an example process for receiving, by a user device, provisioning information to self-provisioning the user device.

FIG. 6 is a flow diagram illustrating an example process for receiving, by a user device, unique provisioning information to self-provisioning the user device, in accordance with one or more aspects of this disclosure. The process of FIG. 6 may be representative of the self-provisioning process user devices undertake following the processes of FIG. 4 or 5. A user computing device, such as user device 14N described in FIGS. 1 and 3, may perform the process of FIG. 6. In some instances, one or more processors of a computing device, such as processors 70 (including self-provision module 90) of user device 14N of FIGS. 1 and 3, may also perform the process of FIG. 6.

As shown in FIG. 6, processors 70 may receive a set of unique provisioning information from computing device 12 (140). In response to receiving the set of unique provisioning information, processors 70 may connect with a network (e.g., network 20) based on at least a portion of the unique provisioning information (142). For example, the unique provisioning information may include network credentials that authorize access to network 20.

Processors 70 may then communicate with one or more servers 22 to retrieve applications associated the owner account identified by the unique provisioning information (144). In addition, processors may 70 may communicate with one or more servers 22 to retrieve applications associated the user account identified by the unique provisioning information (146). Although one or more applications associated with an owner account may retrieved and/or installed, these applications may not be accessible by the user. In other examples, all of the applications and/or setting values retrieved from server 22 may be associated with the user account. Further, processors 70 may establish one or more user guidelines based on the received unique provisioning information (148). The user guidelines may be set by one or more of the owner account, the user account, and a device policy associated with one or both of the owner and user accounts.

After retrieving these applications and setting values, for example, processors 70 may initiate user device 14N for the initial user interaction with user device 14N (150). Completion of step 150 may signal the completion of the self-provisioning process. Once user device 14N is provisioned, processors 70 may set the user device to the home screen or lock screen. In some examples, the user may not need to perform any more provisioning steps to fully utilize user device 14N. In other examples, processors 70 may present one or more questions or steps to obtain new information from the user and/or any confirm that the provisioning process completed correctly.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media or computer-readable storage devices. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
  receiving, by a first computing device, account information that identifies a respective user account for each user of a plurality of users;
  determining, by the first computing device, that a second computing device is within wireless communication range of the first computing device; and
  responsive to determining that the second computing device is within wireless communication range, transmitting, by the first computing device and to the second computing device via a wireless device-to-device communication connection, provisioning information for one user account from the respective user accounts, wherein the provisioning information includes administrative account information, device policy information, and instructions for the second computing device to automatically configure itself, using a network connection distinct from the wireless device-to-device communication connection with the first computing device, with one or more applications retrieved using the network connection and with one or more setting values related to the administrative account and the device policy, and wherein the one or more applications are associated with the one user account associated with one or more users of the plurality of users.

2. The method of claim 1, wherein:
the provisioning information further includes unique provisioning information specific for each of the plurality of users; and
the method further comprises generating, by the first computing device, the unique provisioning information for each of the plurality of users.

3. The method of claim 1, wherein the one user account is a first user account and the provisioning information is first provisioning information, and wherein the method further comprises:
subsequent to transmitting the first provisioning information, determining, by the first computing device, that a third computing device is within wireless communication range of the first computing device;
responsive to determining that the third computing device is within wireless communication range, selecting second provisioning information associated with a second user account from the respective user accounts and includes instructions for the third computing device to automatically configure itself, via the network connection, with one or more applications of the second user account associated with another one or more of the plurality of users; and
responsive to the selection, transmitting, by the first computing device and via the wireless device-to-device communication connection, the second provisioning information to the third computing device.

4. The method of claim 3, wherein:
transmitting the first provisioning information comprises transmitting the first provisioning information during a first time period;
transmitting the second provisioning information comprises transmitting the second provisioning information during a second time period; and
the first time period and the second time period are non-overlapping time periods.

5. The method of claim 1, wherein the administrative account is associated with an entity in control of the second computing device, and the one or more setting values related to the administrative account limit a respective function of the second computing device, and the provisioning information includes network credentials for accessing the network connection.

6. The method of claim 1, further comprising:
subsequent to transmitting the provisioning information to the second computing device, receiving, from the second computing device, a confirmation signal confirming that the provisioning information was received by the second computing device; and
responsive to receiving the confirmation signal, outputting, by the first computing device, a user detectable indication confirming the provisioning information was received.

7. The method of claim 1, wherein the wireless device-to-device communication connection comprises a near-field communication connection.

8. The method of claim 1, wherein the first computing device and the second computing device are distinct mobile computing devices.

9. A computing device comprising:
one or more processors; and
a memory device comprising instructions that when executed by the one or more processors cause the one or more processors to:
receive account information that identifies a respective user account for each user of a plurality of users;
determine that a user computing device is within wireless communication range of the computing device; and
responsive to sensing the user computing device, transmit, to the user computing device via a wireless device-to-device communication connection, provisioning information for one user account from the respective user accounts, wherein the provisioning information includes administrative account information, device policy information, and instructions for the user computing device to automatically configure itself, using a network connection distinct from the wireless device-to-device communication connection with the computing device, with one or more applications retrieved using the network connection with one or more setting values related to the administrative account and the device policy, and wherein the one or more applications are associated with the one user account associated with one or more users of the plurality of users.

10. The computing device of claim 9, wherein:
the provisioning information further includes unique provisioning information specific for each of the plurality of users; and
wherein the instructions when executed by the one or more processors further cause the one or more processors to:
generate the unique provisioning information for each of the plurality of users.

11. The computing device of claim 9, wherein the one user account is a first user account, the provisioning information is first provisioning information, the user computing device is a first user computing device, and wherein the instructions when executed by the one or more processors cause the one or more processors to:
subsequent to transmitting the first provisioning information, determine that a second user computing device is within wireless communication range of the computing device;
responsive to determining that the second user computing device is within wireless communication range, select second provisioning information associated with a second user account from the respective user accounts and includes instructions for the second user computing device to automatically configure itself, via the network connection, with one or more applications of the second user account associated with another one or more of the plurality of users; and
responsive to the selection, transmit, via the wireless device-to-device communication connection, the second provisioning information to the second user computing device.

12. The computing device of claim 9, wherein the administrative account is associated with an entity in control of the user computing device, and the provisioning information includes network credentials for accessing the network connection.

13. The computing device of claim 9, wherein the instructions when executed by the one or more processors cause the one or more processors are configured to:
subsequent to transmitting the provisioning information to the user computing device, receive, from the user computing device, a confirmation signal confirming that the provisioning information was received by the user computing device; and responsive to receiving the confirmation signal, output, via an output device, a user detectable indication confirming the provisioning information was received.

14. The computing device of claim 9, wherein the wireless device-to-device communication connection comprises a near-field communication connection, and wherein the computing device comprises a first near-field communication unit configured to transmit the provisioning information to a second near-field communication unit of the user computing device.

15. The computing device of claim 9, wherein the computing device and the user computing device are distinct mobile computing devices.

16. A non-transitory computer-readable storage medium comprising instructions that, when executed, configure one or more processors of a computing device to:

receive account information that identifies a respective user account for each user of a plurality of users;

determine that a user computing device is within wireless communication range of the computing device; and responsive to determining that the user computing device is within wireless communication range, transmit, to the user computing device via a wireless device-to-device communication connection, provisioning information for one user account from the respective user accounts, wherein the provisioning information includes administrative account information, device policy information, and instructions for the user computing device to automatically configure itself, using a network connection distinct from the wireless device-to-device communication connection with the computing device, with one or more applications retrieved using the network connection and with one or more setting values related to the administrative account and the device policy, and wherein the one or more applications are associated with the one user account associated with one or more users of the plurality of users.

17. The non-transitory computer-readable storage medium of claim 16, wherein:

the provisioning information further includes unique provisioning information specific for each of the plurality of users; and the method further comprises generating, by the first computing device, the unique provisioning information for each of the plurality of users.

18. The non-transitory computer-readable storage medium of claim 16, wherein the administrative account is associated with an entity in control of the second computing device, and the provisioning information includes network credentials for accessing the network connection.

19. A method comprising:

determining that, by a first computing device, a second computing device is within wireless communication range of the first computing device; and responsive to determining that the second computing device is within wireless communication range;

selecting, by the first computing device, first provisioning information for one user account from provisioning information for respective user accounts for each user of a plurality of users; and transmitting, by the first computing device and to the second computing device using a wireless device-to-device communication connection, the first provisioning information for the one user account associated with one user from the plurality of users, wherein the first provisioning information includes device policy information, network credentials that allow the second computing device to access a network connection distinct from the wireless device-to-device communication connection with the first computing device, one or more setting values related to the device policy information and that limit a respective function of the second computing device, an administrator password, and instructions for the second computing device to automatically configure itself, using the network connection and with the one or more setting values, with at least one application retrieved from the network connection and associated with the one user account and for use by the one user.

* * * * *